United States Patent [19]

Watanabe

[11] Patent Number: 4,606,446

[45] Date of Patent: Aug. 19, 1986

[54] APPARATUS FOR CONTROLLING A MAGNETIC PARTICLE CLUTCH FOR USE IN A VEHICLE

[75] Inventor: Tomoyuki Watanabe, Susono, Japan

[73] Assignee: Toyota Jidosha Kabushiki Kaisha, Japan

[21] Appl. No.: 596,806

[22] Filed: Apr. 4, 1984

[30] Foreign Application Priority Data

Apr. 8, 1983 [JP] Japan .................. 58-062798

[51] Int. Cl.⁴ ............................................ F16D 27/00
[52] U.S. Cl. ................................ 192/0.076; 192/21.5; 192/103 R
[58] Field of Search ................. 192/3.56, 0.032, 0.076, 192/0.096, 21.5, 103 R

[56] References Cited

U.S. PATENT DOCUMENTS 3,163,272 12/1964 Baumann ........................... 192/21.5
4,072,220 2/1978 Hamada ........................... 192/0.076
4,081,065 3/1978 Smyth et al. ..................... 192/0.076
4,401,199 8/1983 Takano et al. ..................... 192/21.5
4,403,683 9/1983 Takano ............................. 192/21.5
4,515,257 5/1985 Takano et al. ................... 192/0.096

FOREIGN PATENT DOCUMENTS 2083589 3/1982 United Kingdom ............... 192/21.5

Primary Examiner—Rodney H. Bonck
Assistant Examiner—Alan G. Towner
Attorney, Agent, or Firm—Parkhurst & Oliff

[57] ABSTRACT

An apparatus for controlling a magnetic particle clutch for use of a vehicle. The magnetic particle clutch is provided between an engine and a belt type continuously varible transmission, and is designed to commence to slip before a torque transmitting belt commences to slip on the pulleys of the continuously variable transmission.

8 Claims, 9 Drawing Figures

APPARATUS FOR CONTROLLING A MAGNETIC PARTICLE CLUTCH FOR USE IN A VEHICLE

BACKGROUND OF THE INVENTION

The present invention relates to an apparatus for controlling a magnetic particle clutch for use of a vehicle in which an engine torque is transmitted by a magnetic particle clutch and a belt type continuously variable transmission, and particularly to an apparatus for protecting a belt type continuously variable transmission equipped with a magnetic particle clutch. This invention protects the belt by controlling the amount of torque transmitted through a magnetic particle clutch.

A continuously variable transmission includes a V-belt extending between driving and driven pulleys, with one or both of the pulleys being able to adjust the size of their respective V-shaped openings which hold the V-belt, thereby controlling the revolution ratio between the driving and driven pulleys. The size of the V-shaped opening is varied by changing the amount of pressure being fed into a hydraulic cylinder of either of the pulleys. Hence, the effective diameter of the pulley can be varied by changing the amount of pressure being fed into the hydraulic cylinder, thereby allowing for a continuously variable ratio of driving pulley effective diameter to driven pulley effective diameter. The V-shaped openings on the driving and driven pulleys are each defined by an area between a fixed portion of each pulley and a movable portion of each pulley, the size of the V-shaped opening being dependent upon the pressure inputted to the hydraulic cylinders, a hydraulic apparatus provides hydraulic pressure to each of the movable pulleys.

In the above-described belt type continuously variable transmission, some vehicles are equipped with a magnetic particle clutch which is provided between an engine and a continuously variable transmission. Such a magnetic particle clutch transmits an engine torque to a continuously variable transmission, in proportion to a magnitude of an electric current carried to a field coil. It is conventional that the magnitude of an electric current carried to a field coil is designed to be a fixed value after a magnetic particle clutch is engaged. Hence, the entire engine torque is transmitted to a belt type continuously variable transmission. When brake are applied quickly, a large amount of an engine torque is transmitted to the belt type continuously variable transmission, thereby resulting in slippage between the torque transmitting belt and the movable pulley.

In order to obviate the foregoing drawback, to the a large line pressure is supplied hydraulic cylinder for the movable pulley. Due Thus, the value of the line pressure exerted on the movable pulley in a direction that the movable pulley is approached to a torque transmitting belt, becomes large. According to the above countermeasure, the large line pressure is constantly supplied to a hydraulic cylinder. Hence, the power consumed by generating the high line pressure is large and the fuel efficiency is low. Further, when an unusually unusual large torque is transmitted to the continuously variable transmission, it is difficult to prevent slippage between the belt and the movable pulley.

SUMMARY OF THE INVENTION

The present invention was made in view of the foregoing background and to overcome the foregoing drawbacks. It is an object of this invention to provide an apparatus for controlling a magnetic particle clutch for use of a vehicle which reduced the slippage between a torque transmitting belt and a movable pulley and which also reduces fuel consumption.

To attain the above object, the present invention provides an apparatus according to the following description:

In a vehicle having an engine, a continuously variable transmission including a driving pulley comprising a fixed member and a movable member, a hydraulic cylinder for actuating the movable member to form an opening between the movable member and the fixed member, a driven pulley with another fixed member and another movable member, another hydraulic cylinder for actuating the another movable member to form another opening between the movable member and the fixed member, a belt member spanning the pulleys so that the effective diameter of the pulleys can be varied with regard to each other so that different speed ratios can be obtained, and a magnetic particle clutch including a field coil therein, the magnetic particle clutch being provided between the engine and the continuously variable transmission to control the torque transmitted from the engine to the continuously variable transmission according to the magnitude of an electric current fed into the field coil, the apparatus for controlling the amount of the torque transmitted by controlling the electric current fed into the field coil, including:

an engine rotation speed detecting means for detecting an actual engine speed;

an engine load detecting means for detecting an engine load applied to the engine;

an engine output torque determining means for determining the actual engine output torque according to the engine speed detected by the engine rotation speed detecting means and to the engine load detected by the engine load detecting means;

an electric current control means for determining the amount of the electric current to be fed into the field coil according to the actual engine output torque determined by the engine output torque determining means, and for setting a predetermined value below which the magnetic particle clutch will transmit the torque;

a vehicle speed detecting means for detecting a vehicle speed; and a clutch engagement means for almost stopping the electric current fed into the field coil and for making the magnetic particle clutch disengage.

In the apparatus for controlling a magnetic particle clutch constructed in the above-described way, as shown in FIG. 1, an actual engine rotation speed and an amount of an engine load are detected by an engine rotation speed detecting means and an engine load detecting means, respectively. In an engine output torque determining means 92, an actual engine output torque is determined according to both the actual engine rotation speed and the required engine load, by employing a predetermined relationship. The magnetic particle clutch is controlled by an electric current control means 94 so that the torque transmitted has a value which is larger than that of the actual engine output torque and is much smaller than that of an unusual large value of the engine torque. When the vehicle speed detected by a vehicle speed detecting means 98 becomes lower than a predetermined fixed vehicle speed, a clutch engagement blocking means 96 stops the supply of the electric current to a field coil. Hence, of the engine output torque is unusually large while the magnetic particle clutch 12 is engaged, the magnetic particle clutch 12 is caused to slip before the belt type continuously variable transmission begins to slip. Thus, slippage in the belt type continuously variable transmission is prevented. It is not necessary to set a high line pressure of the continuously variable transmission to prevent slippage between the belt and the movable pulley even during in the unusual conditions of high engine output torque. Hence, power losses will be low, and the fuel consumption can be reduced.

Further, when a vehicle runs at a lower vehicle speed than that of a predetermined fixed speed, the electric current is not supplied to a field coil and, the magnetic particle clutch is thereby disengaged. Hence, the amount of heat generated in the magnetic particle clutch is reduced and the load on an electric power source is also reduced.

The above objects, features and advantages of the present invention will become more apparent from the following description of the preferred embodiment taken in conjunction with the accompanying drawings.

DETAILED DESCRIPTION OF THE PREFERRED EMBODIMENT

The present invention is described in detail with reference to the accompanying drawings which illustrate one embodiment of the present invention.

Figure 1:
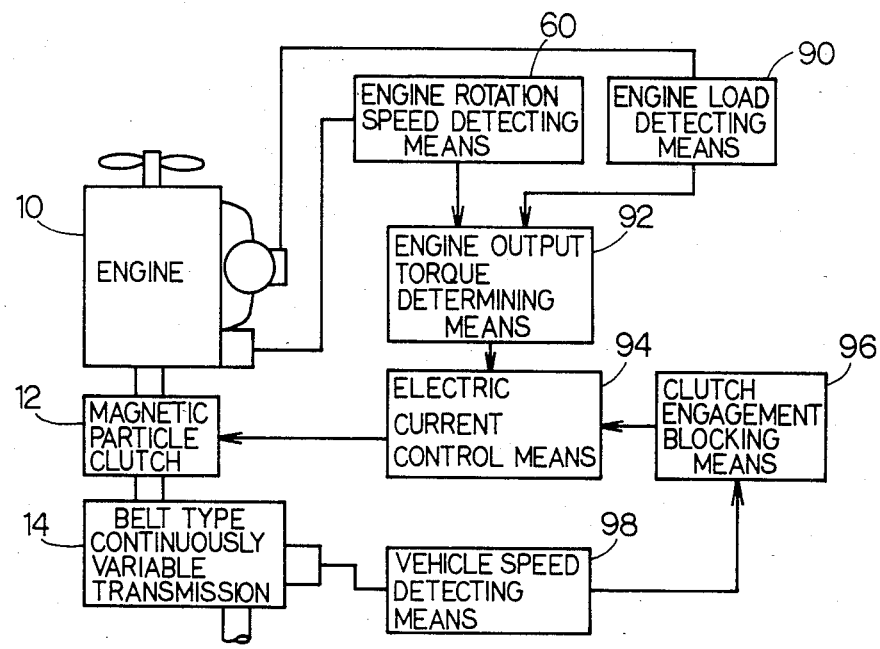
FIG. 1 is a block diagram illustrating the connecting relationship between elements according to the present invention.
Figure 3:
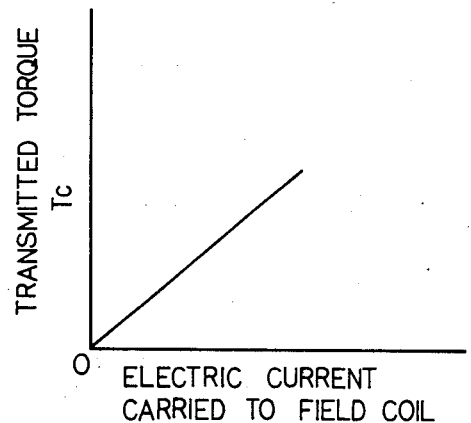
FIG. 3 is a graph illustrating the relationship between torque transmitted and the electric current carried to a field coil employed in the magnetic particle clutch of the present invention.
Figure 2:
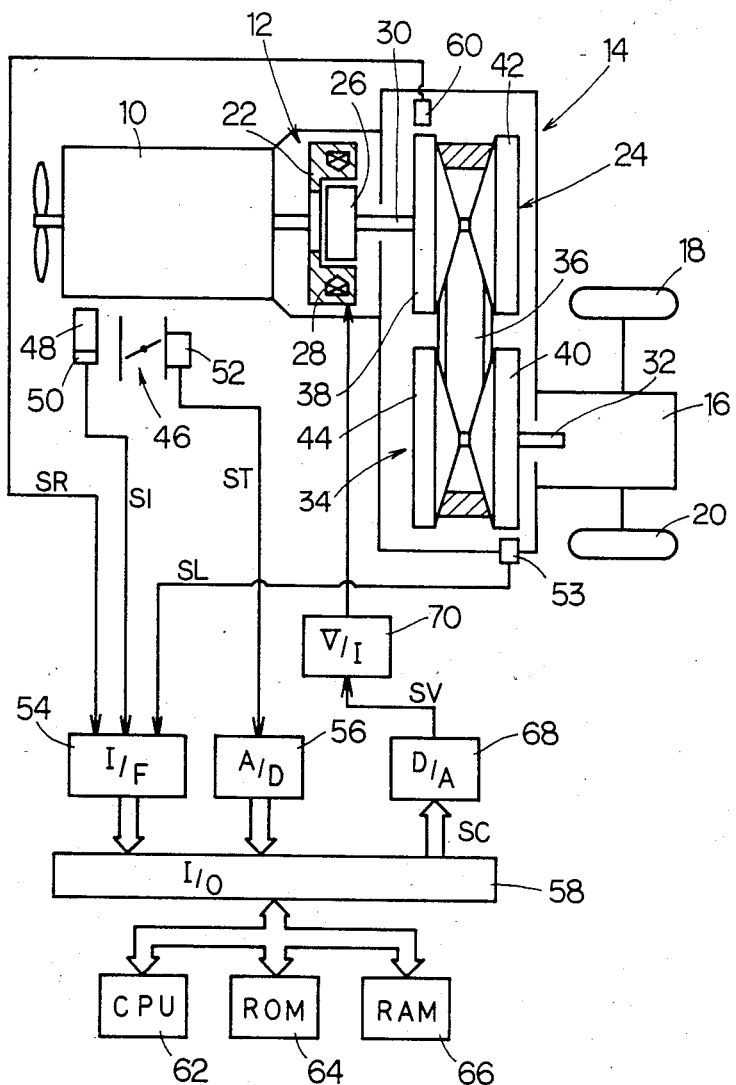
FIG. 2 is a schematic view illustrating the driving apparatus and electric circuits of the vehicle to which an embodiment of the present invention is applied.

Referring to FIG. 2, a rotation force generated by an engine 10 is transmitted through a magnetic particle clutch 12, a belt type continuously variable transmission 14 and a differential gear device 16 to tire wheels 18 and 20. The magnetic particle clutch 12 includes a driving rotation member 22 connected to the engine 10, a driven rotation member 26 connected to an input movable pulley 24, magnetic particle clutch (not shown in the drawings) filled in a space defined between the driving rotation member 22 and the driven rotation member 26, and a field coil 28 which is integrally provided within the driving rotation member 22, for filling magnetic particles with a magnetic force in the space defined between the driving rotation member 22 and the driven rotation member 26. In FIG. 3, the relation between a transmitted torque and an electric current carried to a field coil. As apparent from FIG. 3, the transmitted torque Tc from the driving rotation member 22 to the driven rotation member 26, increases according to the increase in the amount of the electric current carried to the field coil 28.

The belt type continuously variable transmission 14 has an input movable pulley 24, an output movable pulley 34, and a torque transmitting belt 36 spanned between the input movable pulley 24 and the output movable pulley 34. The input movable pulley 24 is connected through an input rotation shaft 30 to the driven rotation member 26 of the magnetic particle clutch 12. The input movable pulley 24 includes a fixed portion 38 secured to the input rotation shaft 30, and a movable portion 42 which is rotatable with the input rotation shaft 30. The movable portion 42 faces the fixed portion 38, and is mounted to be displaced in the axial direction of the input rotation shaft 30. A V-shaped opening is defined by an area between the fixed portion 38 and the movable portion 42 of the input movable pulley 24. The output movable pulley 34 and the input movable pulley 24 constitute a pair of pulleys, and the output movable pulley 34 is connected through the output rotation shaft 32 to a differential gear device 16. The output movable pulley 34 includes a fixed portion 40 secured to the output rotation shaft 32, and a movable portion 44 which is rotatable with the output rotation shaft 32. The movable portion 44 faces the fixed portion 40, and is mounted to be displaced in the axial direction of the output rotation shaft 32. A V-shaped opening is defined by an area between the fixed portion 40 and the movable portion 44 of the output movable pulley 34.

The movable rotation members 42 and 44 are designed to be actuated by hydraulic actuators (not shown in drawings). The hydraulic actuators are operated by a hydraulic pressure control circuit (not shown in drawings) mounted on the belt type continuously variable transmission 14. In the hydraulic pressure control circuit, there is provided a hydraulic pressure generating apparatus which generates a line pressure. The value of the line pressure is designed to increase in proportion to the increase in the rotational speed of the engine 10 and an opening of a throttle valve 46. Further, the value of the line pressure is predetermined to have a value so that the rotational force of the belt type continuously variable transmission is transmitted without slip within a range of a permissible torque.

An ignition signal sensor 50 is provided on an ignition device 48 of the engine, in order to detect the rotational speed of the engine 10. The ignition signal sensor 50 issues an ignition signal S1. A throttle position sensor 52 is provided at a position adjacent to the throttle valve 46, which is mounted on an intake manifold of the engine 10, in order to detect the amount of a load applied onto the engine 10. The throttle position sensor 52 issues a throttle opening signal ST. A rotation sensor 53 is provided in the belt type continuously variable transmission 14, in order to detect a vehicle speed (a rotational speed of the output rotation shaft 32). The rotation sensor 53 issues a rotation signal SL. These signals SI and SL are fed into an inter-face (hereinafter referred to as I/F) 54. An analog-digital converter (hereinafter referred to as A/D) 56 receives the throttle opening signal ST. If the engine 10 consists of four cylinders, the ignition signal sensor 50, issues two pulses per one revolution of the engine 10. In the I/F 54, the ignition signal SI is converted to a code signal which designates a period "te" of the ignition signal SI. The code signal is fed into input/output ports (hereinafter referred to as I/O ports) 58. The throttle opening signal ST is generally a voltage signal. The A/D 56 converts the throttle opening signal ST to a code signal which indicates an opening (%) of the throttle valve 46. Thus obtained code signal is fed into the I/O ports 58. The rotation sensor 53 is designed to issue the rotation signal SL of the pulses which are synchronized with the rotation of the output rotation shaft 32. The I/F 54 converts the rotation signal SL to a code signal which designates a period "tc" of the rotation signal SL. The code signal is fed into the I/O ports 58. A rotation sensor 60, which detects the rotation number of the input movable pulley 24, is provided in the belt type continuously variable transmission 14. The rotation sensor 60 detects the passing of one magnet (not shown in drawings) mounted on the outer circumferential surface of the fixed portion 38, and generates a rotation signal SR which is a pulse signal of a period corresponding to the rotation of the input movable pulley 24. The rotation signal SR is fed into the I/F 54. Further, the I/F 54 converts the rotation signal SR to a code signal which designates a period of the rotation signal SR. The code signal is fed into the I/O ports 58. The rotation signal SR corresponds to the rotation speed of the driven rotation member 26 of the magnetic particle clutch 12.

The I/O ports 58 are connected through a data bus line to a central processing unit (hereinafter referred to as CPU) 62, a read-only memory (hereinafter referred to as ROM) 64, and a random-access memory (hereinafter referred to as RAM) 66. The ROM 64 stores a predetermined control program which is shown by a flow chart in FIG. 4, and data shown in FIGS. 5(a), (b) and FIG. 6. According to the stored program in the ROM 64, the CPU 62 carries out arithmetic and logic processing functions while employing the memory function of the RAM 66. The CPU 62 determines the amount of the electric current to be fed into the magnetic particle clutch 12, and feeds a control signal SC through the I/O ports 58 to a digital-analog converter (hereinafter referred to D/A) 68. The control signal SC designates the electric current fed into the field coil 28. The D/A 68 converts the control signal SC to a voltage signal SV, and feeds the voltage signal SV to a voltage-electric current converter (hereinafter referred to as V/I) 70. The V/I 70 generates an electric current corresponding to the voltage signal SV fed from the D/A 68, and feeds the electric current to the field coil 28.

Figure 7:
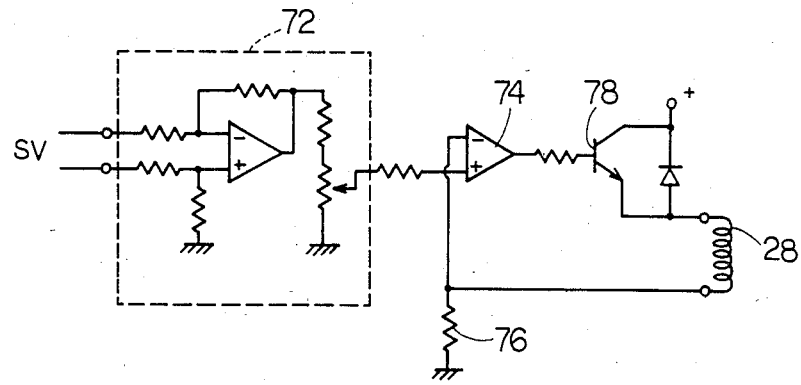
FIG. 7 is a view illustrating an electric circuit of a voltage-electric current converter (V/I) shown in FIG. 2.
Figure 8:
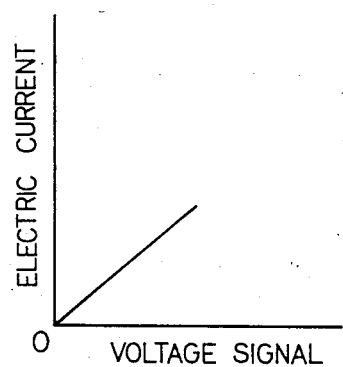
FIG. 8 is a graph illustrating a relation between an electric current and an electric voltage signal, employed in the V/I converter shown in FIG. 2.

One example of the detailed construction of the V/I 70, is shown in FIG. 7. After the voltage signal SV is converted by a signal level converting circuit 72 to a low level value, the signal is fed into a plus input terminal of a different amplifier 74. A voltage of a resistor 76, corresponding to the electric current is fed into the minus input terminal of the different amplifier 74. The resistor 76 is connected with the field coil 28 in series in order to detect the electric current fed into the field coil 28, and has a small resistance. The different amplifier 74 feeds a base electric current to a driver transistor 78 so that the signal difference between the input terminals may equal zero. The transistor 78 is connected between plus power sources and the field coil 28, and feeds the electric current to the field coil 28 according to the output signals of the different amplifier 74. In other words, the different amplifier 74 makes a feed-back control. Even though the value of the resistance of the field coil 28 varies due to the change of the temperature, the electric current accurately proportioning to the voltage signal SV is fed into the field coil 28.

Figure 4:
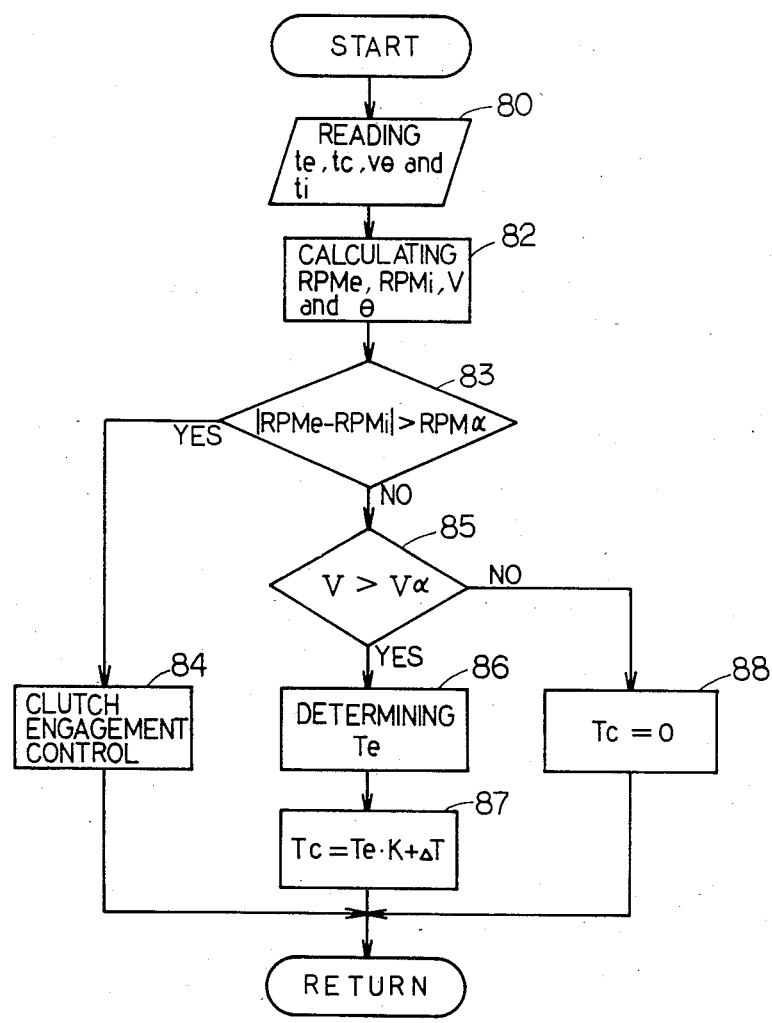
FIG. 4 is a flow chart illustrating the operations employed in the apparatus according to the present invention.

The operation of the present embodiment is explained hereunder in conjunction with a flow chart shown in FIG. 4. The first step 80 reads the periods te, ti and tc of the ignition signal SI and the rotation signals SR and SL, and further reads the voltage signal V corresponding to the opening of the throttle valve 46 into the RAM 66. The opening of the throttle valve 46 is indicated by the throttle opening signal ST. The program proceeds to Step 82. The step 82 calculates the rotation speed $RPM_e$ of the engine 10, the rotational speed $RPM_i$ of the driven rotation member 26 of the magnetic particle clutch 12, the vehicle speed V, and the opening $\theta$ (%) of the throttle valve 46 according to memorized following equations (1), (2), (3) and (4), based on the fed data te, ti, tc and $V_\theta$:

$$RPM_e(\text{rpm}) = 60 \text{ sec.}/2te \quad (1)$$

$$RPM_i(\text{rpm}) = 60 \text{ sec.}/ti \quad (2)$$

$$V(\text{km/h}) = (60 \text{ sec.}/tc) \cdot (1/D) \cdot 2\pi r \cdot 60 \text{ min.}(1/1000) \quad (3)$$

$$\theta(\%) = (V_e - V_{min})/(V_{max} - V_{min}) \quad (4)$$

where,

D: the reduction ratio of the differential gear device 16

R: the radius of the wheels 18 and 20

$V_{min}$: the voltage of the signal ST at the fully closed time of the throttle valve 46 (idling condition)

$V_{max}$: the voltage of the signal ST at the fully opened time of the throttle valve 46 (full load of the engine 10)

The ignition signal SI generates two pulses per one revolution of the engine 10. The rotation signals SR and SL generate one pulse per one rotation of the rotation shafts 30 and 32, respectively. The step 82 performs functions of the engine rotation speed detecting means 60, a means for detecting a rotation speed of the driven rotation member 26 of the magnetic particle clutch 12, the vehicle speed detecting means 98, and the engine load detecting means 90 for detecting the amount of the load applied to the engine 10.

The program proceeds to step 83. In step 83, it is determined whether the absolute value of the difference between the rotation speed $RPM_e$ of the engine 10 and the rotation speed $RPM_i$ of the driven rotation member 26 of the magnetic particle clutch 12 is smaller than a value $RPM_\alpha$ corresponding to a predetermined computer error range or not. When the absolute value is not smaller than the value $RPM_\alpha$, it is determined that the magnetic particle clutch 12 is not engaged yet. Hence, the program proceeds to step 84, in order to engage the magnetic particle clutch 12. Contrary to this, when the absolute value is smaller than the value $RPM_\alpha$, it is determined that the clutch 12 is already engaged. The program proceeds to step 85. In step 84, the transmitting torque Tc of the magnetic particle clutch 12 is increased according to the increase in the rotation speed $RPM_e$ of the engine 10. The control signal SC is outputted from the I/O ports 58 so that the transmitting torque Tc may reach to its maximum value. A controlled electric current, which increases according to the increase in the rotating speed RPM$_e$, is fed from the V/I 70 to the field coil 28. Hence, the magnetic particle clutch 12 is smoothly engaged.

In step 85, it is determined whether the vehicle is in the running condition or in the almost stopped condition. When the vehicle speed V is more than a predetermined very small value V$_\alpha$, it is determined that the vehicle is in the running condition. Contrary to this, when the vehicle speed V is less than the value V$_\alpha$, it is determined that the vehicle is in the almost stopped condition. The value V$_\alpha$ is a predetermined value, and is a little more than zero. In the case that the vehicle is in the running condition, the program proceeds to step 86. In step 86, the actual output torque Te of the engine 10 is determined. In step 87, the transmitting torque Tc of the magnetic particle clutch 12 is calculated by the following equation, so that the torque Tc may become a little larger than the actual output torque Te, and may become quite smaller than the allowable transmitting torque of the belt type continuously variable transmission 14.

$$Tc = Te \cdot K + \Delta T \tag{5}$$

where,

K: constants which are more than 1, and values which make Tc larger than Te $\Delta T$: a predetermined value which does not make the engaged torque of the magnetic particle clutch zero even if Te is zero In step 87, the control signal SC is outputted from the I/O ports 58, so that the transmitting torque Tc determined by the foregoing equation (5) can be obtained. Further, the electric current corresponding to the control signal SC is fed from the V/I 70 to the field coil 28. Thus, step 86 performs the function of the engine output torque determining means 92. Step 87 performs the function of the electric current control means 94 for controlling the electric current fed into the field coil 28.

The foregoing steps are repeatedly carried out at a high speed. The electric current carried to the field coil 28 is controlled so that the transmitting torque of the magnetic particle clutch 12 may be a little larger than the actual output torque Te of the engine 10. Hence, even when the output torque Te of the engine 10 exceeds the usual value and drastically increases, a slip is generated in not the belt type continuously variable transmission 14 but the magnetic particle clutch 12. The slip in the belt type continuously variable transmission is dissolved.

According to a prior belt type continuously variable transmission, the line pressure supplied to the hydraulic actuators for actuating the driving movable pulley 24 and the driven movable pulley 34, is required to have such a high value as the slip in the transmission may be obviated. Due to this, the power loss consumed by generating a high line pressure becomes large. Contrary to this, according to the present embodiment, the line pressure can be set to have a little larger value than both the usual engine output torque Te and the transmitting torque Tc of the magnetic particle clutch 12. The set line pressure does not cause a slip. Hence, the power loss can be small, and the fuel consumption is improved.

Figure 6:
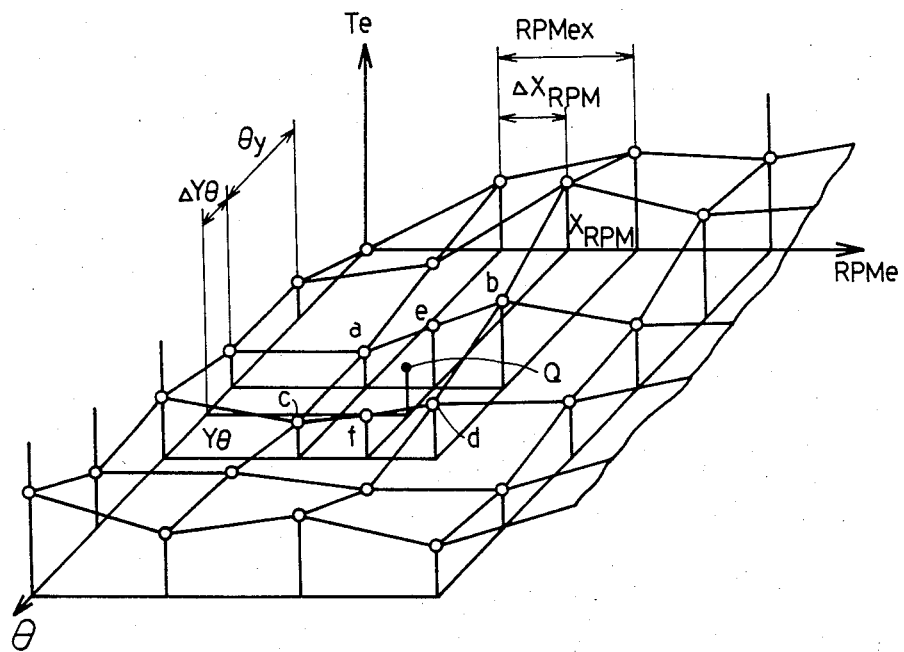
FIG. 6 is a graph illustrating the relationship between engine rotation speed RPMe, a throttle opening θ degree, and an engine output torque Te, memorized in ROM in FIG. 2.
Figure 9:
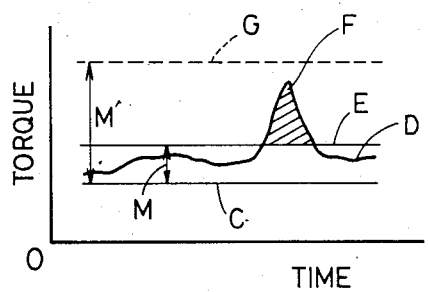
FIG. 9 is a graph illustrating a relation between torque and time, employed in an embodiment of the present invention.

In FIG. 9, the reference C designates an engine output torque Te memorized by the relation shown in FIG. 6, and the reference D designates an actual output torque of the engine 10. The transmitting torque Tc of the magnetic particle clutch 12, after the torque Tc is controlled in step 87, is designated by a line E in FIG. 9. As shown in FIG. 9, the value of the line E is controlled to be a little larger than that of the engine output torque line C. The line pressure of the belt type continuously variable transmission 14 is determined to have a value sufficient to transmit a torque indicated by the line E in FIG. 9. When the output of the engine 10 is greater than the transmitting torque Tc of the magnetic particle clutch 12, slippage occurs at the clutch. When the output of the engine 10 is less than or equal to the transmitting torque Tc of the magnetic particle clutch 12, the magnetic particle clutch 12 transmits the torque from the engine to the CVT. On the other hand, the line pressure according to a prior art, is determined to have a value large enough to transmit even a torque indicated by a line G in FIG. 9, in order to prevent slippage at an unusual peak F of the engine torque. The difference torque M between the transmitting torque Tc (the line E) of the magnetic particle clutch 12 and the engine output torque C, according to the present invention, can be remarkably reduced, in comparison with the difference torque M' according to the prior art between the torque indicated in the line G and the engine output torque C. Hence, the power loss can be reduced. According to experimentation done by the inventor of the present application, the fuel consumption has been improved by 2 to 3 percent.

The actual output torque Te of the engine 10 is determined in the foregoing step 86 by, for example, the following procedure: The ROM 64 memorizes data maps shown in FIGS. 5 and 6. The coordinates X$_{RPM}$ on RPMe axis of coordinates and the coordinates Y$_\theta$ on $\theta$ axis of coordinates, shown in FIG. 6, are determined according to the rotation speed RPMe of the engine 10 and the opening $\theta$ of the throttle valve 46, shown in FIG. 5. FIG. 6 is a three-dimensional data map which shows the relation between the throttle opening $\theta$, the rotation speed RPMe of the engine and the actual output torque Te of the engine 10. The data $\theta$, RPMe and Te are experimentally determined. For example, data at points (maximum 4 points), whose throttle opening and engine speed are near to the actual throttle opening $\theta$ and the actual engine speed RPMe at the point (Y$_\theta$, X$_{RPM}$) of the coordinates Y$_\theta$ and X$_{RPM}$, are selected. The actual output torque Te of the engine is compensated by the following equation:

$$Te = (f - e) \cdot \Delta Y_\theta + e \tag{6}$$

where, $\Delta Y_\theta$: the value of Y$_\theta$ coordinates at each point under a decimal point $$e = (b - a) \cdot \Delta Xn + a$$

$\Delta X_{RPM}$: the value of RPMe coordinates at each point under a decimal point $$f = (d - c) \cdot \Delta Xn + c$$

Figure 5:
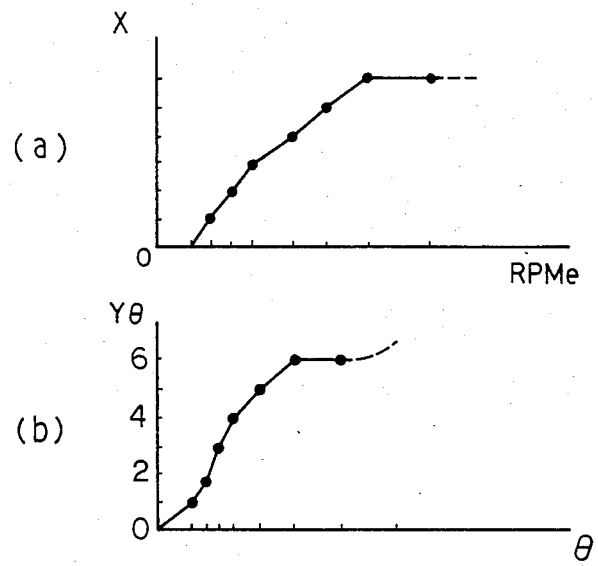
FIG. 5 is a graph illustrating an engine rotation speed RPMe and a throttle opening θ degree, which are memorized in ROM in FIG. 2.

When the actual output torque Te of the engine 10 is determined from the data map shown in FIG. 6, the points of the X$_{RPM}$ on the RPMe axis coordinates and of the Y$_\theta$ on the $\theta$ axis coordinates, are determined by the relation shown in FIG. 5. Hence, in the area where the actual output torque Te of the engine 10 varies a large, many measured points can be selected. Contrary to this, in the area where the actual output torque Te of the engine 10 varies a little, small number of measured points can be selected. It enables that many points are selected in the important area.

In the foregoing step 85, when the vehicle speed V is smaller than the predetermined small value Vα, it is determined that the vehicle is in the condition that the vehicle almost stops. Next, the program proceeds to step 88 which performs a function of the clutch engagement blocking means 96. In step 88, the control signal SC, which makes the electric current zero fed from the V/I 70 to the field coil 28, is outputted from the I/O ports 58. Even after the magnetic particle clutch 12 is already engaged, it is not always necessitated that the magnetic particle clutch 12 is engaged, in the area where the vehicle speed is near to zero. Hence, the engagement of the magnetic particle clutch 12 is stopped, and this results in the reduction in the heat generation of the magnetic particle clutch 12 and the load applied on the electric power source in order to feed the electric current to the field coil 28.

Thus, according to the present embodiment, after the magnetic particle clutch 12 is engaged, the transmitting torque Tc of the magnetic particle clutch 12 is set to have a little larger than the actual output torque Te of the engine 10. Hence, in the unusual condition of the output torque Te of the engine 10, the magnetic particle clutch 12 slips in advance of the slip in the belt type continuously variable transmission 14. The slip in the belt type continuously variable transmission 14 is prevented from being generated. Further, it is not necessitated to set such a high line pressure of the belt type continuously variable transmission as the slip does not generate even in the unusual condition of the engine torque Te. The power loss can be reduced, and the fuel consumption is improved. When the vehicle is in the low speed, the electric current fed into the field coil 28 is forced to cut. The heat generation of the magnetic particle clutch 12, and the electric load applied on the electric power sources are reduced.

While the present invention has been in its preferred embodiment in conjunction with the accomapnying drawings which shows one embodiment of the present invention, the present invention may be otherwise embodied.

For example, in the foregoing step 88 shown in FIG. 4, the electric current fed into the field coil 28, may not be completely zero. In short, it is sufficient to lower the value of the electric current up to the value with which the magnetic particle clutch 12 is substantially disengaged.

In the foregoing step 86 shown in FIG. 4, the output torque Te of the engine 10 is determined by the memorized data map. The functional formulas, whose variables are the throttle opening θ and the rotation speed RPMe of the engine 10, may be memorized in advance. The functional formulas may be calculated according to the variables.

In the foregoing embodiment, the load applied onto the engine 10 is designated by the opening of the throttle valve 46, but the engine load may be designated by the displaced stroke of the accelerator pedal, an intake vacuum of the engine 10, the rising rate of the rotation speed of the engine 10, or an accelerator sensor for detecting an acceleration of the vehicle.

In the foregoing steps 86 and 87, the torque Te is determined, and the torque Te is calculated according to the value of Te, but the data in data map memorized in FIG. 6 may be multiplied by the constants and the value ΔT may be added to the multiplied value. In this case, the torque Te can be directly determined according to the data map.

While the present invention has been described in its preferred embodiment, it is to be understood that the invention is not limited thereto, and may be otherwise embodied within the scope of the following claims.

What is claimed is:

1. A vehicle comprising an engine, a continuously variable transmission including a driving pulley comprising a fixed member and a movable member, the movable member being actuated by an hydraulic cylinder to form an opening between the movable member and the fixed member, a driven pulley with another fixed member and another movable member, said another movable member being similarly actuated by another hydraulic cylinder to form another opening between the movable member and the fixed member, and a belt member spanning the pulleys so that an effective diameter of the pulleys can be varied with regard to each other to obtain different speed ratios, a magnetic particle clutch including a field coil therein, the magnetic particle clutch being provided between the engine and the continuously variable transmission and functioning to control the torque transmitted from the engine to the continuously variable transmission according to the magnitude of an electric current fed into the field coil, and an apparatus for controlling the amount of the torque transmitted by controlling the electric current fed into the field coil, comprising:
   an engine rotation speed detecting means for detecting an actual engine speed;
   an engine load detecting means for detecting an engine load applied onto the engine;
   an engine output torque determining means for determining actual engine output torque according to the engine speed detected by the engine rotation speed detecting means and the engine load detected by the engine load detecting means;
   an electric current control means for determining the amount of the electric current to be fed into the field coil according to the actual engine output torque determined by the engine output torque determining means, and for setting a predetermined value for the transmitted torque of the magnetic particle clutch so that the magnetic particle clutch only transmits torque having a value less than said predetermined value;
   a vehicle speed detecting means for detecting a vehicle speed; and
   a clutch engagement blocking means for reducing the electric current fed into the field coil to disengage the magnetic particle clutch.

2. The apparatus of claim 1, wherein the amount of the torque transmitted from the driving pulley to the driven pulley is in proportion to the value of the electric current fed into the field coil.

3. The apparatus of claim 1, wherein the electric current control means has a different amplifier which performs a feed-back control in order to feed the electric current in accurate properties to a voltage signal fed into the field coil, even when the resistance of the field coil varies due to the change of the temperature.

4. The apparatus of claim 1, wherein it is determined by the vehicle speed detecting means that the vehicle is in the stopped condition when the vehicle speed detecting means detects a lower vehicle speed than a predetermined vehicle speed $V_\alpha$ almost equaling zero, and further it is determined by the vehicle speed detecting means that the vehicle is in the running condition when the vehicle speed detecting means detects a higher vehicle speed than the predetermined vehicle speed $V_\alpha$.

5. The apparatus of claim 1, wherein the magnetic particle clutch comprises a driving member connected to the engine, and a driven member connected to the continuously variable transmission, and a space filled with magnetic particles is defined between the driving member and the driven member of the magnetic particle clutch.

6. The apparatus of claim 5, wherein the clutch engagement blocking means disengages the magnetic particle clutch when the absolute value of the difference between the engine speed and the rotation speed of the driven member of the magnetic particle clutch is smaller than a predetermined value.

7. A method for controlling a torque transmitted by a magnetic particle clutch used in a vehicle, said vehicle including an engine having an output shaft;

a continuous variable transmission having a driving pulley which comprises a fixed member and a movable member, said movable member being actuated by an hydraulic cylinder to form an opening between the movable member and the fixed member, a driven pulley with another fixed member and another movable member, said another movable member being similarly actuated by another hydraulic cylinder to form another opening between the movable member and the fixed member, and a belt member spanning the pulleys so that an effective diameter of the pulleys can be varied with regard to each other to obtain different speed ratios;

a magnetic particle clutch including a driving member, a driven member, a field coil and a plurality of magnetic particles, the driving member being connected to the output shaft of the engine, the driven member being connected to the driving pulley of the continuously variable transmission, the field coil being mounted on the driving member, the plurality of magnetic particles being located between the driving member and the driven member, the plurality of magnetic particles selectively connecting the driven member to the driving member in accordance with an electric current applied to the field coil, the electric current being applied in proportion to the rotational speed of the engine such that when a predetermined value of electric current is applied to the field coil, the driven member is securely connected to the driving member by the plurality of magnetic particles and the magnetic particle clutch transmits torque from the engine to the continuously variable transmission and when less than the predetermined value of electric current is applied to the field coil, the driven member and the driving member slip relative to each other and the magnetic particle clutch does not transmit the torque from the engine to the continuously variable transmission;

an engine rotational speed detecting means for detecting an actual engine speed;

an engine load detecting means for detecting an engine load applied onto the engine;

a driven member rotational speed detecting means for detecting an actual rotational speed of the driven member of the magnetic particle clutch;

a vehicle speed detecting means for detecting an actual vehicle speed; and an electric current control means for controlling an input value of the electric current to the field coil of the magnetic particle clutch, the method comprising:

detecting the actual engine speed by the engine rotational speed detecting means;

detecting the actual rotational speed of the driven member of the magnetic particle clutch by the driven member rotational speed detecting means;

detecting the actual vehicle speed by the vehicle speed detecting means;

calculating an absolute value of the difference between the detected engine rotational speed and the detected driven member rotational speed;

determining whether the absolute value of the difference is larger than a predetermined difference value;

outputting an electric current to the field coil of the magnetic particle clutch when the absolute value of the difference is determined to be larger than the predetermined difference value in the determining step, such that the electric current control means outputs at least the predetermined value of electric current to the field coil;

comparing the detected actual vehicle speed with a predetermined vehicle speed when the absolute value of the difference is determined to be equal to or less than the predetermined difference value in the determining step;

determining an engine output torque according to the detected actual engine speed and the detected engine load when the detected actual vehicle speed is larger than the predetermined vehicle speed in the comparing step;

calculating a transmitting torque in accordance with the determined engine output torque, the value of the transmitting torque being larger than the determined engine output torque and being equal to or larger than the transmitting torque of the magnetic particle clutch;

outputting the electric current to the field coil of the magnetic particle clutch in accordance with the calculated transmitting torque; and determining the transmitting torque to be zero when the detected actual vehicle speed is equal to or less than the predetermined vehicle speed in the comparing step; and when the transmitting torque is determined to be zero outputting no electric current to the field coil of the magnetic particle clutch.

8. A method for controlling a torque transmitted by a vehicle particle clutch used in a vehicle, said magnetic including an engine having an output shaft;

a continuous variable transmission having a driving pulley which comprises a fixed member and a movable member, said movable member being actuated by an hydraulic cylinder to form an opening between the movable member and the fixed member, a driven pulley with another fixed member and another movable member, said another movable member being similarly actuated by another hydraulic cylinder to form another opening between the movable member and the fixed member, and a belt member spanning the pulleys so that an effective diameter of the pulleys can be varied with regard to each other to obtain different speed ratios;

a magnetic particle clutch including a driving member, a driven member, a field coil and a plurality of magnetic particles, the driving member being connected to the output shaft of the engine, the driven member being connected to the driving pulley of the continuously variable transmission, the field coil being mounted on the driving member, the plurality of magnetic particles being located between the driving member and the driven member, the plurality of magnetic particles selectively connecting the driven member to the driving member in accordance with an electric current being applied to the field coil, the electric current being applied in proportion to the rotational speed of the engine, such that when a predetermined value of the electric current is applied to the field coil, the driven member is securely connected to the driving member by the plurality of magnetic particles and the magnetic particle clutch transmits torque from the engine to the continuously variable transmission and when less than the predetermined value of electric current is applied to the field coil, the driven member and the driving member slip relative to each other and the magnetic particle clutch does not transmit the torque from the engine to the continuously variable transmission;

an engine rotational speed detecting means for detecting an actual engine speed;

an engine load detecting means for detecting an engine load applied onto the engine;

a driven member rotational speed detecting means for detecting an actual rotational speed of the driven member of the magnetic particle clutch;

a vehicle speed detecting means for detecting an actual vehicle speed; and an electric current control means for controlling an input value of the electric current to the field coil of the magnetic particle clutch, the method comprising:

detecting the actual engine speed by the engine rotational speed detecting means;

detecting the actual rotational speed of the driven member of the magnetic particle clutch by the driven member rotational speed detecting means;

detecting the actual vehicle speed by the vehicle speed detecting means;

calculating an absolute value of the difference between the detected engine rotational speed and the detected driven member rotational speed;

determining whether the absolute value of the difference is larger than a predetermined difference value;

comparing the detected actual vehicle speed with a predetermined vehicle speed;

determining an engine output torque according to the detected actual engine speed and the detected engine load;

calculating a transmitting torque in accordance with the determined engine output torque, the value of the transmitting torque being larger than the determined engine output torque and being equal to or larger than the transmitting torque of the magnetic particle clutch; and outputting the electric current to the field coil of the magnetic particle clutch in accordance with the calculated transmitting torque.

* * * * *